United States Patent

Yamada et al.

Patent Number: 6,019,495
Date of Patent: Feb. 1, 2000

[54] APPARATUS FOR DETECTING STEP-OUT OF SUSPENSION CONTROL SYSTEM

[75] Inventors: Naoki Yamada, Higashikamo gun; Satoru Onozawa, Anjou; Shigetaka Isogai, Chiryu; Kazuo Ogawa, Toyota, all of Japan

[73] Assignees: Aisin Seiki Kabushiki Kaisha, Kariya; Toyota Jidosha Kabushiki Kaisha, Toyota, both of Japan

[21] Appl. No.: 08/260,224

[22] Filed: Jun. 14, 1994

[30] Foreign Application Priority Data

Jun. 14, 1993 [JP] Japan .................................. 5-141967

[51] Int. Cl.⁷ .................................................. B60G 17/015
[52] U.S. Cl. ...................................... 364/424.05; 280/707
[58] Field of Search ....................... 364/424.05; 280/707, 280/840

[56] References Cited

U.S. PATENT DOCUMENTS

| | | | |
|---|---|---|---|
| 4,856,798 | 8/1989 | Buma et al. | 280/707 |
| 5,159,554 | 10/1992 | Buma et al. | 364/424.05 |
| 5,269,558 | 12/1993 | Yoshioka et al. | 364/424.05 |
| 5,384,705 | 1/1995 | Inagaki et al. | 364/424.05 |

FOREIGN PATENT DOCUMENTS

| | | |
|---|---|---|
| 63-170171 | 7/1988 | Japan . |
| 2208108 | 8/1990 | Japan . |
| 3276807 | 12/1991 | Japan . |
| 3276808 | 12/1991 | Japan . |
| 0415113 | 1/1992 | Japan . |

*Primary Examiner*—Gary Chin
*Attorney, Agent, or Firm*—Sughrue, Mion, Zinn, Macpeak & Seas

[57] ABSTRACT

The presence or absence of any step-out of an actuator which is used to adjust a damping factor is made always detectable without additional provision of any special sensor such as a position encoder. Based on an equation of motion of a suspension, an estimated acceleration Gp derived from a detected vehicle height Sh and its differential Vr, and an actual acceleration Sg detected by an acceleration sensor, a deviation ΔG is derived and compared against a threshold A. If the magnitude of the deviation is high, the occurrence of the step-out is declared after a given time interval $T_0$. Upon detecting the occurrence of the step-out, the actuator position is returned to its home position, and the value in the position register is initialized. A skyhook control of the suspension is performed.

3 Claims, 7 Drawing Sheets

$m\ddot{x}_1 + K(x_1 - x_0) + C_v(\dot{x}_1 - \dot{x}_0) = 0$ $m\ddot{x}_1 + K(x_1 - x_0) + C\dot{x}_1 = 0$ $$\dot{x} = \frac{dx}{dt}$$

$$\ddot{x} = \frac{d(\frac{dx}{dt})}{dt}$$

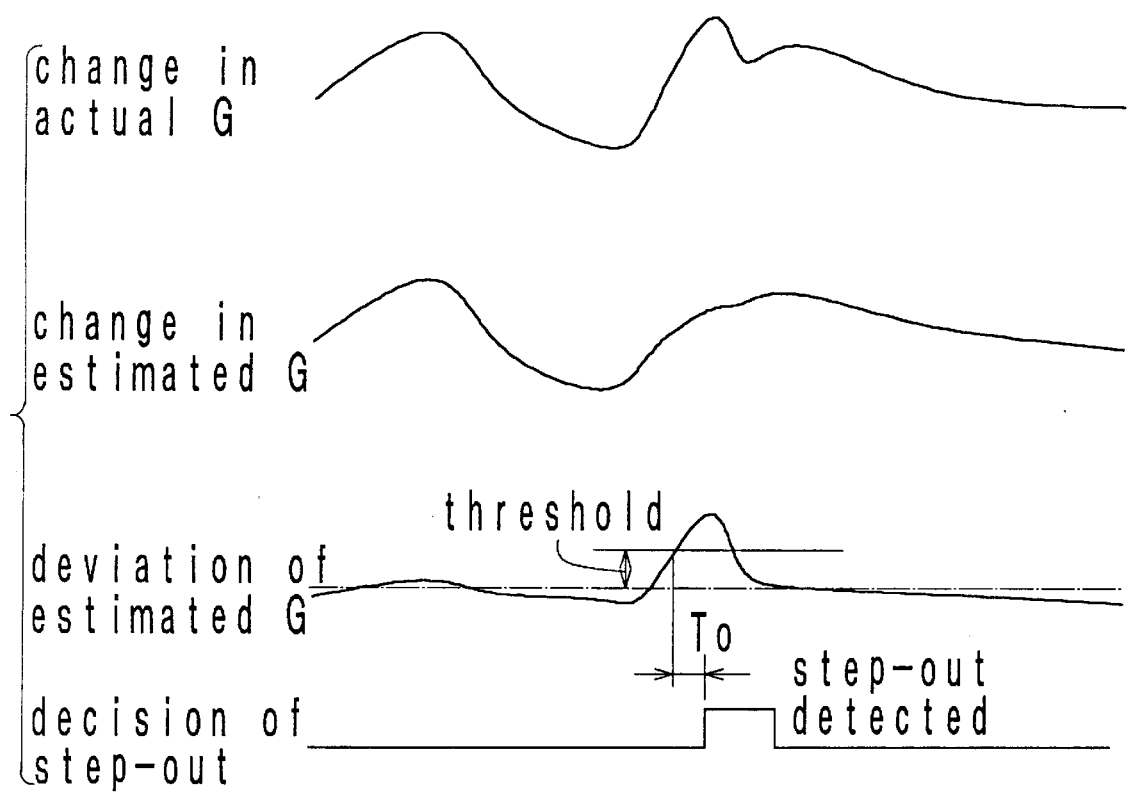

APPARATUS FOR DETECTING STEP-OUT OF SUSPENSION CONTROL SYSTEM

BACKGROUND OF THE INVENTION

The invention relates to an apparatus for detecting step-out of a suspension control system. A suspension which is mounted onboard a vehicle, for example, is provided with a shock absorber (or absorbers) including a mechanism for adjusting a damping factor and a controller which drives the mechanism to set the damping factor of the shock absorber at a target value in order to reduce the amplitude of the oscillation of a sprung weight (such as a car body) which is caused by the oscillation of an unsprung weight (such as wheels).

Various proposals for such controllers have been made in the prior art. For example, Japanese Laid-Open Patent Application No. 208,108/1990 discloses a damping control in a manner corresponding to a vertical, lateral or longitudinal acceleration as well as a damping control corresponding to a vehicle height (the height of car body—the height of wheel).

Japanese Laid-Open Patent Application No. 276,807/1991 discloses a damping control in which the vertical acceleration of the sprung weight is integrated to calculate a rate of change in the vertical direction of the spring weight while the displacement of the unsprung weight is differentiated to calculate a rate of change in the vertical direction of the unsprung weight, with a target value obtained as a required damping force which is calculated on the basis of the rates of change in the vertical direction of both the spring weight and the unsprung weight.

Also, Japanese Laid-Open Patent Application No. 276,808/1991 discloses a damping control in which the displacement of the unsprung weight is differentiated to calculate a rate of change in the vertical direction of the unsprung weight while a rate of change in the vertical direction of the spring system is estimated from the displacement of the unsprung weight, with a target value determined as a required damping force which is calculated on the basis of the rates of change in the vertical direction of both the sprung weight and the unsprung weight.

Furthermore, Japanese Laid-Open Patent Application No. 15,113/1992 discloses a damping control in which the vertical acceleration of the spring system is integrated to calculate a rate of change in the vertical direction of the sprung weight while a damping force corresponding to the ratio of the rate of change in the vertical direction to the vertical acceleration is calculated, thereby choosing it as a target value.

Finally, Japanese Laid-Open Patent Application No. 170,171/1988 discloses a steering control in which the presence or absence of a step-out of a stepping motor is detected from the comparison of an output of a sensor which detects the amount by which steerable road wheels are steered against its target value.

In a skyhook control of a suspension used in an automobile, for example, a damping factor adjusting mechanism of a shock absorber, which functions as an actuator, must be frequently driven. However, if a stepping motor is used to drive the actuator, such frequent drive may cause a step-out of the motor. Specifically, the stepping motor may fail to track a signal which is output from a controller, resulting in a deviation between a desired actuator position (damping factor) and an actual actuator position of the controller. The occurrence of such step-out fails to provide a normal damping control, resulting in a loss of the skyhook control.

Accordingly, in order to maintain the reliability of the suspension control system, it is important to detect the occurrence of a step-out of a stepping motor or the like. However, there have been no such detecting means in the conventional suspension control systems. Consequently, once the step-out occurs, a normal condition cannot be resumed unless the position of the actuator is initialized again.

In different fields, it is known to detect the occurrence of a step-out of a stepping motor by coupling a position encoder to the drive shaft of the stepping motor, and normally comparing the angular position detected by the encoder against a target position, thereby detecting the occurrence or not of the step-out. However, a position encoder of this kind is expensive and requires a fine adjustment of the mounting position. In addition, a suspension control system requires such a position encoder to be mounted for each of four shock absorbers, and accordingly the use of such position encoder is not practical.

SUMMARY OF THE INVENTION

Accordingly, it is a task of the invention to enable the detection of the occurrence of a step-out at all times while minimizing an increase in the cost involved.

The above task is accomplished in accordance with the invention by providing an apparatus for detecting a step-out of a suspension control system including shock absorbers (1FL, 1FR, 1RL, 1RR) each including a damping factor adjusting mechanism, and a controller (ECU) which drives the mechanism toward a given target value and sets up the damping factor of the shock absorber at the target value; the apparatus comprising distance detecting means (2FL, 2FR, 2RL, 2RR) for detecting a relative distance between a first object which supports the suspension and a second object which is supported by the suspension; acceleration detecting means (4FL, 4FR, 4RL, 4RR) for detecting a vertical acceleration applied to the second object supported by the suspension; acceleration estimating means (16) for deriving an estimated value (Gp) of the vertical acceleration applied to the second object supported by the suspension on the basis of a relative distance (Sg) detected by the distance detecting means, an equation of motion of the suspension and a damping factor (C) of a shock absorber controlled by the controller; and step-out detecting means (17, 18, 19, 1A, 1B) for detecting the presence or absence of a deviation between an actual condition of the damping factor adjusting mechanism and a desired condition thereof which is intended by the controller in accordance with a deviation ($\Delta$G) between the actual acceleration (Sg) detected by the acceleration detecting means and the estimated acceleration derived by the acceleration estimating means.

In a preferred embodiment of the invention, the step-out detecting means is arranged such that the presence of a deviation between the actual condition of the damping factor adjusting mechanism and the desired condition thereof intended by the controller is declared when the number of times (DCNT) that the deviation between the actual and the estimated acceleration has exceeded a given threshold (A) or the length of duration which the deviation continues has exceeded a given value ($D_0$).

In a preferred embodiment of the invention, there is also provided initializing means (25, 26) for repositioning the damping factor adjusting mechanism to a given initial condition whenever the step-out detecting means has declared the presence of a deviation between the actual condition of the damping factor adjusting mechanism and the desired condition thereof intended by the controller.

In a preferred form of the invention, the controller performs a skyhook control (22).

It is to be no ted that characters and numerals appearing in parentheses represent characters and numerals used to designate components of an embodiment to be described later, but it should be understood that such components of the invention are not limited to the specific elements illustrated in the embodiment.

Generally, a suspension can be modelled as shown in FIG. 3(a) where m represents a sprung mass, Cv a damping factor of a shock absorber, K a spring constant of a suspension spring, $x_1$ the position of the sprung mass, and $x_0$ the position of an unsprung mass. The equation of motion is indicated below. It is to be noted that an arrangement as shown in FIG. 3(a) in which Cv has a variable value is referred to as a semi-active model.

$$m \cdot (d^2x_1/dt^2) + K \cdot (x_1-x_0) + Cv \cdot [(dx_1/dt)-(dx_0/dt)] = 0 \quad (1)$$

When such suspension is modelled as shown in FIG. 3(b) in which the mass m is maintained at a given elevation in the air (which is referred to as a skyhook model), the equation of motion is indicated as below.

$$m \cdot (d^2x_1/dt^2) + K \cdot (x_1-x_0) + C \cdot (dx_1/dt) = 0 \quad (2)$$

In order to cause the suspension to function as a skyhook model as illustrated in FIG. 3(b), the both equations (1) and (2) may be equated to each other, and a damping factor Cv which is determined from the following equation may be used as a damping factor Cv for the shock absorber.

$$Cv = C \cdot (dx_1/dt)/[(dx_1/dt)-(dx_0/dt)] \quad (3)$$

Considering equation (1), the distance $(x_1-x_0)$ between the sprung mass and the unsprung mass is detected by the distance detecting means. By differentiating the distance $(x_1-x_0)$, the rate of relative displacement $[(dx_1/dt)-(dx_0/dt)]$ between the sprung and the unsprung mass is calculated. Since the mass m, the damping factor Cv and the spring constant K are known, it is possible to determine the acceleration $(d^2x_1/dt^2)$ applied to the sprung mass from equation (1). However, when a step-out occurs in the actuator which adjusts the damping factor Cv, the damping factor Cv controlled by the controller which performs the skyhook control no longer matches the damping factor Cv of the actual suspension. In such instance, the estimated acceleration $(d^2x_1/dt^2)$ determined from equation (1) no longer matches the actual acceleration applied to the sprung mass. In effect, the acceleration actually applied to the spring mass is detected by the acceleration detecting means, so that by utilizing the magnitude of a deviation between the detected value and the estimated acceleration, the presence or absence of any occurring step-out of the actuator can be recognized.

BRIEF DESCRIPTION OF THE DRAWINGS

FIG. 4 is a series of timing charts, illustrating a change in the actual and the estimated acceleration and the presence or absence of the step-out;

DETAILED DESCRIPTION OF PREFERRED EMBODIMENT

Figure 5:
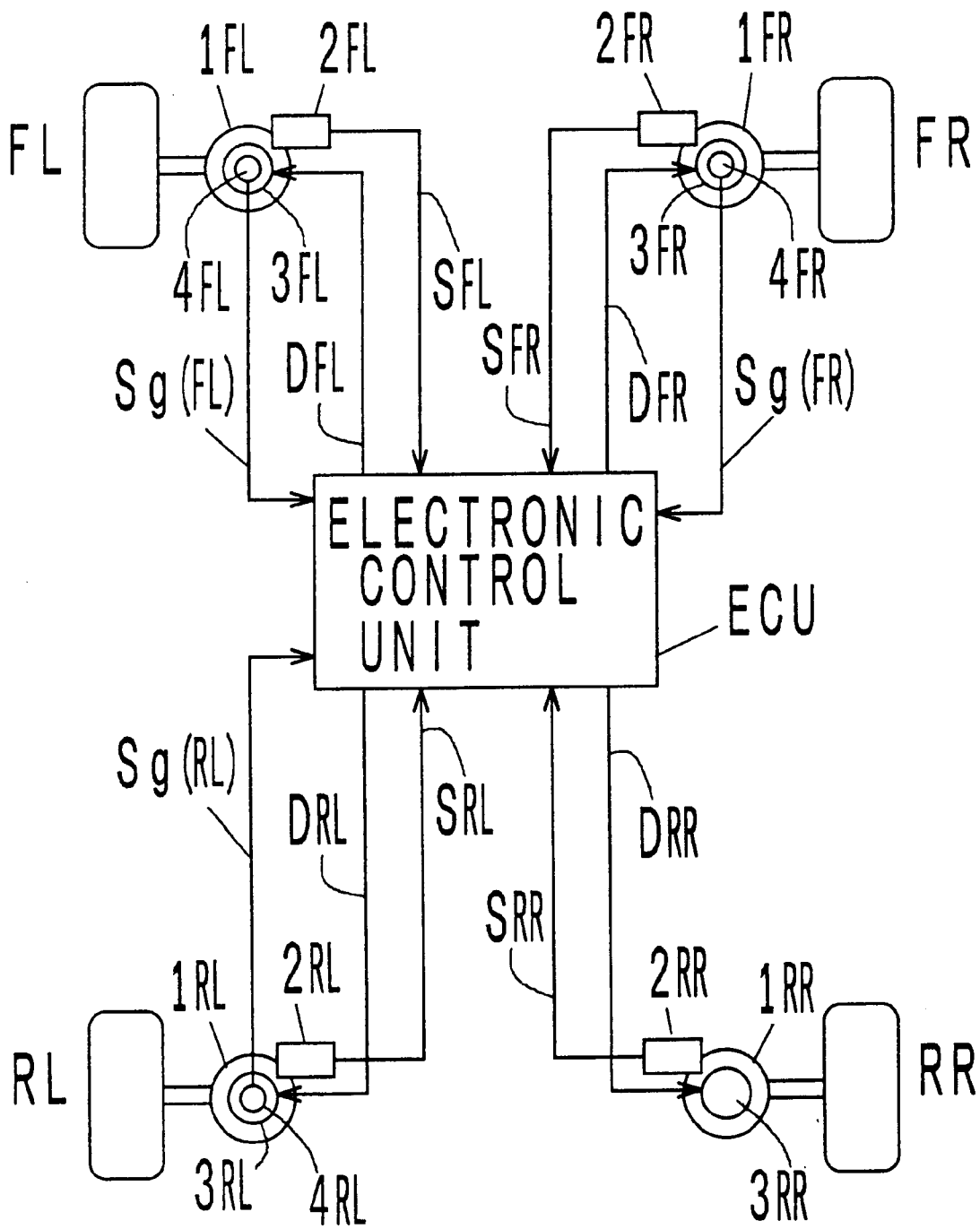
FIG. 5 is a block diagram of an apparatus of an embodiment.
Figure 7:
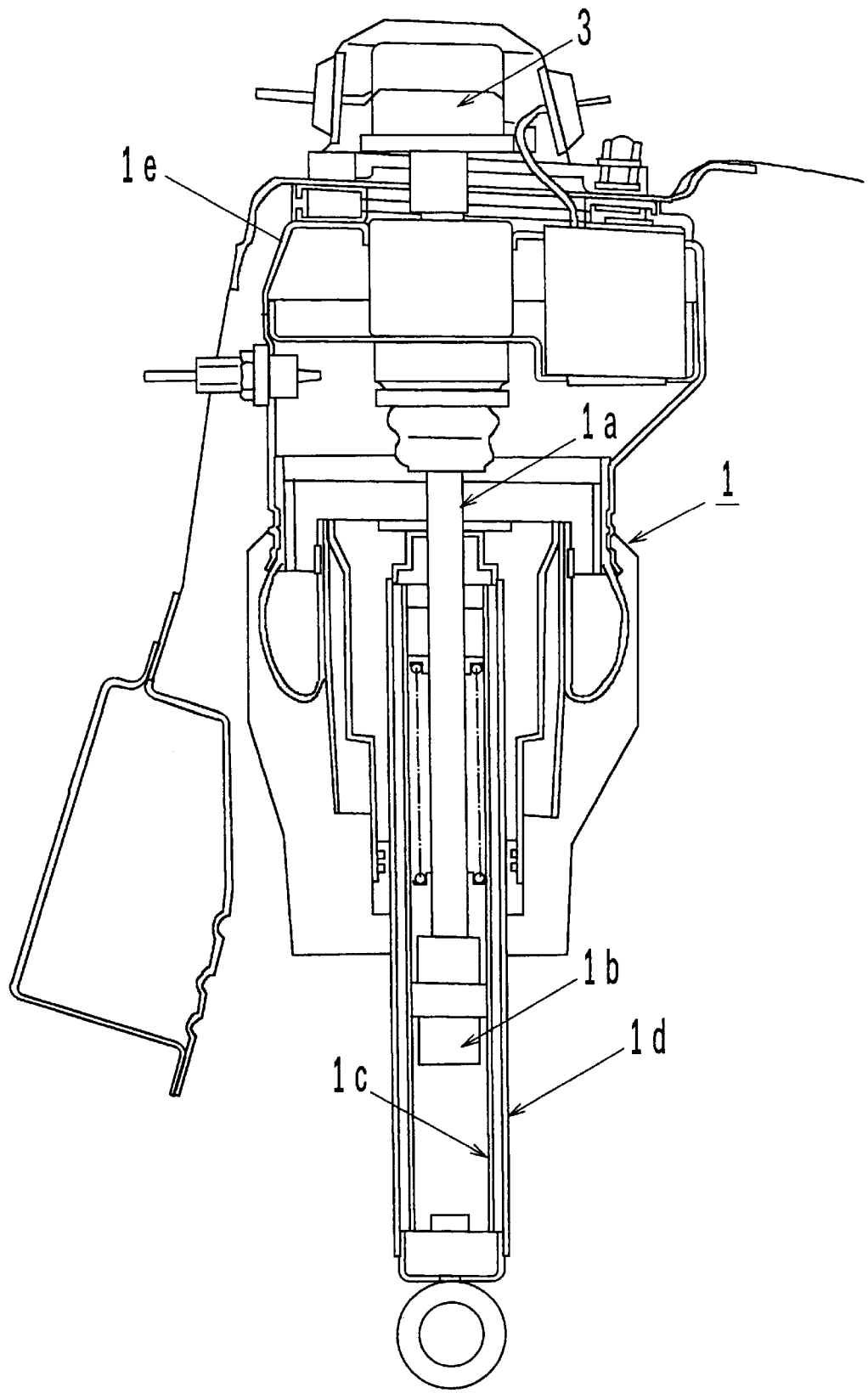
FIG. 7 is a longitudinal section of a shock absorber of the embodiment.

FIG. 5 shows an arrangement of a skyhook controller for an automobile suspension. Referring to FIG. 5, in the example shown, a car body, not shown, is supported by four sets of suspension 1FL, 1FR, 1RL and 1RR, each carried by an associated one of front left (FL), front right (FR), rear left (RL) and rear right (RR) wheels. The construction of a shock absorber 1 of one of the suspensions (1FL, 1FR, 1RL or 1RR) is shown in longitudinal section in FIG. 7. In this Figure, a hollow piston rod 1a is secured to a piston 1b including a damping adjusting valve which is internally housed within an inner sleeve 1c which is in turn contained in an outer cylinder 1d. The rod 1a internally contains a control rod (not shown), the upper end of which is connected to an output shaft of a damping adjusting actuator 3. An enclosure 1e has mounted thereon a pair of oppositely located channel-shaped connecting rings which are provided with stud bolts (not shown) used to secure it to a car body.

The damping adjusting valve of the piston 1b includes an outer sleeve which is disposed within the piston 1b and including an opening which allows a communication between an upper space (the internal space of the inner sleeve 1c) and a lower space, and an inner sleeve disposed in sliding contact with the outer sleeve and having its interior communicating with the upper space and including an opening formed in its peripheral surface through which a communication with the lower space is allowed through the opening formed in the outer sleeve. The lower end of the control rod is connected to the inner sleeve. When the output shaft of the actuator 3 rotates in a forward direction, the inner sleeve of the valve is driven through the control rod to rotate in the forward direction, whereby an overlap between the openings formed in the inner and the outer sleeve of the valve increases progressively, thus reducing the damping factor of the shock absorber 1. When the output shaft of the actuator 3 rotates in the other direction, the damping factor changes oppositely or increases progressively.

Figure 3A:
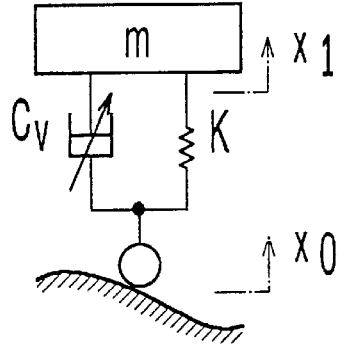
FIGS. 3a and 3b are block diagrams illustrating models representing the motion of a suspension.
Figure 3B:
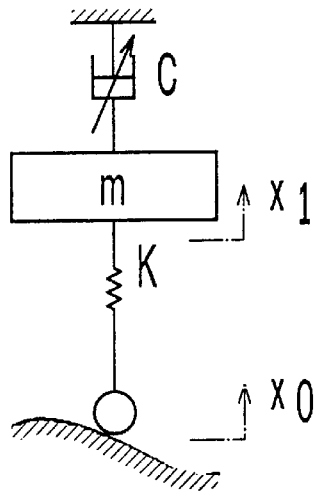

Returning to FIG. 5, vehicle height sensors 2FL, 2FR, 2RL and 2RR are disposed adjacent to each of the suspensions 1FL, 1FR, 1RL and 1RR, respectively, associated with the four wheels. Each of the sensors detects a relative distance between an axle position (as illustrated at $x_0$ in FIGS. 3a and 3b) and a given location on a car body (as illustrated at $x_1$ in FIGS. 3a and 3b) as a vehicle height, and delivers a corresponding output. Acceleration sensors 4FL, 4FR and 4RL are disposed on the suspensions 1FL, 1FR and 1RL, respectively, of three wheels for detecting a vertical acceleration. While the suspension 1RR is not associated with an acceleration sensor, its acceleration can be determined by calculation from the output of other sensors.

An electronic control unit ECU calculates a target value for the damping factor to be used during the skyhook control on the basis of vehicle height signals SFL, SFR, SRL and SRR delivered from the four vehicle height sensors 2FL, 2FR, 2RL and 2RR, and acceleration signals Sg(FL), Sg(FR) and Sg(RL) delivered from the three acceleration sensors, and in the event the prevailing damping factor of the respective suspension differs from the target value for the damping factor which is thus calculated, it delivers drive signals DFL, DFR, DRL and DRR to the actuators 3FL, 3FR, 3RL and 3RR of the respective suspensions. Each of the actuators 3FL, 3FR, 3RL and 3RR is constructed in the manner of a stepping motor, having an output shaft which is rotatable through an angular range of 120° in either forward or reverse direction, and which can be positioned at each of 16 steps through an electric control. A rotation exceeding the angular range of 120° is mechanically blocked. Accordingly, for the valve of each shock absorber, the damping factor can be adjusted at one of 16 steps by driving the actuators 3FL, 3FR, 3RL and 3RR.

Figure 6:
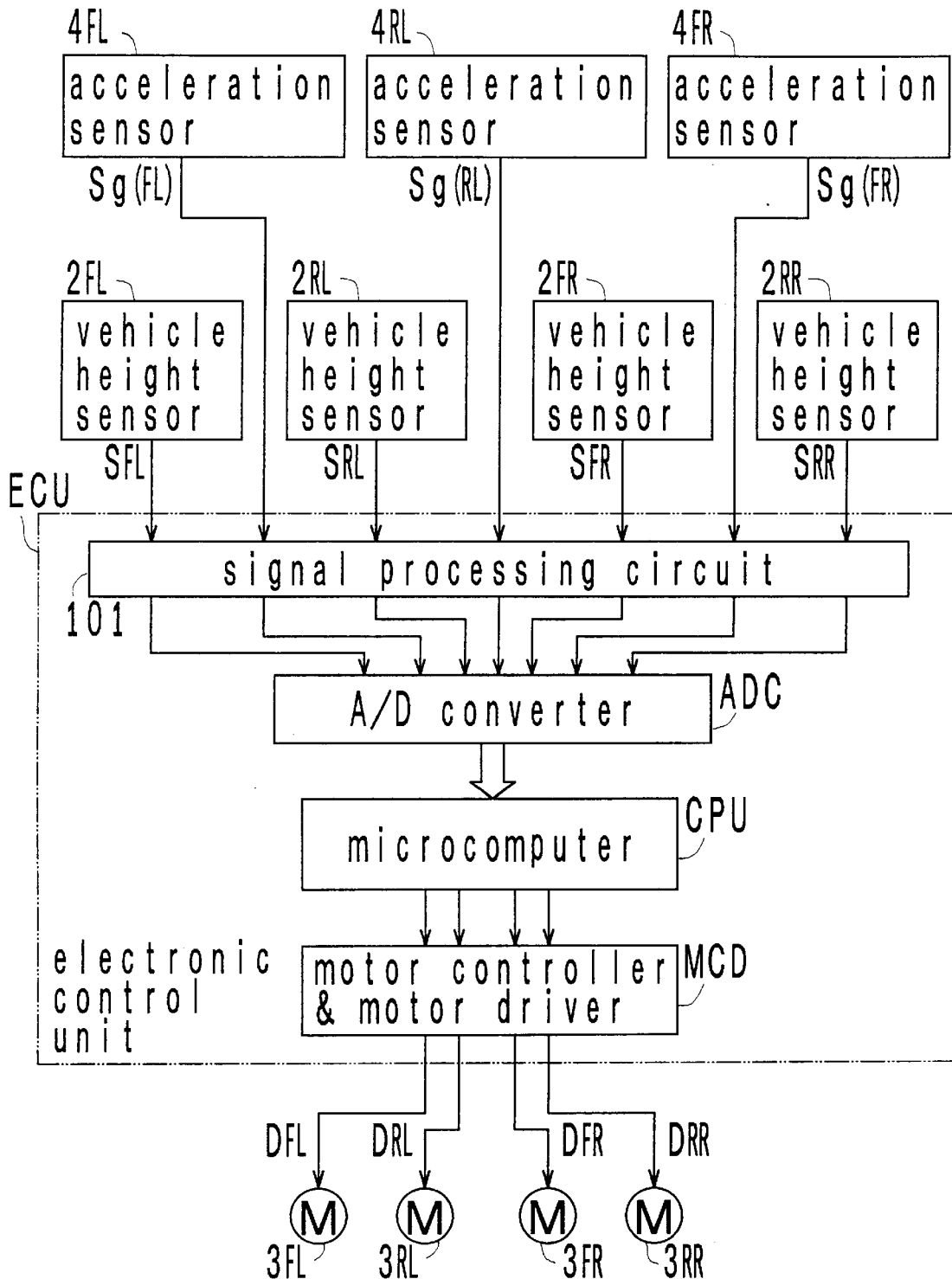
FIG. 6 is a block diagram showing the arrangement of an ECU shown in FIG. 5.

The arrangement of the electronic control unit ECU is shown in detail in FIG. 6. Referring to this Figure, the signals SFL, SFR, SRL and SRR delivered from the vehicle height sensors and the signals Sg(FL), Sg(FR) and Sg(RL) delivered from the acceleration sensors are input to an A/D converter ADC through a signal processing circuit 101. The signal processing circuit 101 is an analog circuit including amplifiers and waveform shapers. A signal delivered from the signal processing circuit 101 is sampled by the converter ADC, whereby the sampled signal is converted into a digital signal having a level corresponding to the analog value, for input to a microcomputer CPU. The microcomputer CPU performs calculations for the skyhook control, as will be further described later, on the basis of four vehicle height (or relative distance) information and three acceleration signals delivered from the converter ADC, thus calculating a target value of the damping factor for each of the suspensions. In the event the damping factor of the respective suspension is different from the target value calculated for the damping factor, the microcomputer applies a control signal to a motor controller and motor driver MCD to drive the actuators 3FL, 3FR, 3RL and 3RR so as to bring the damping factor into coincidence with the target value.

Figure 1:
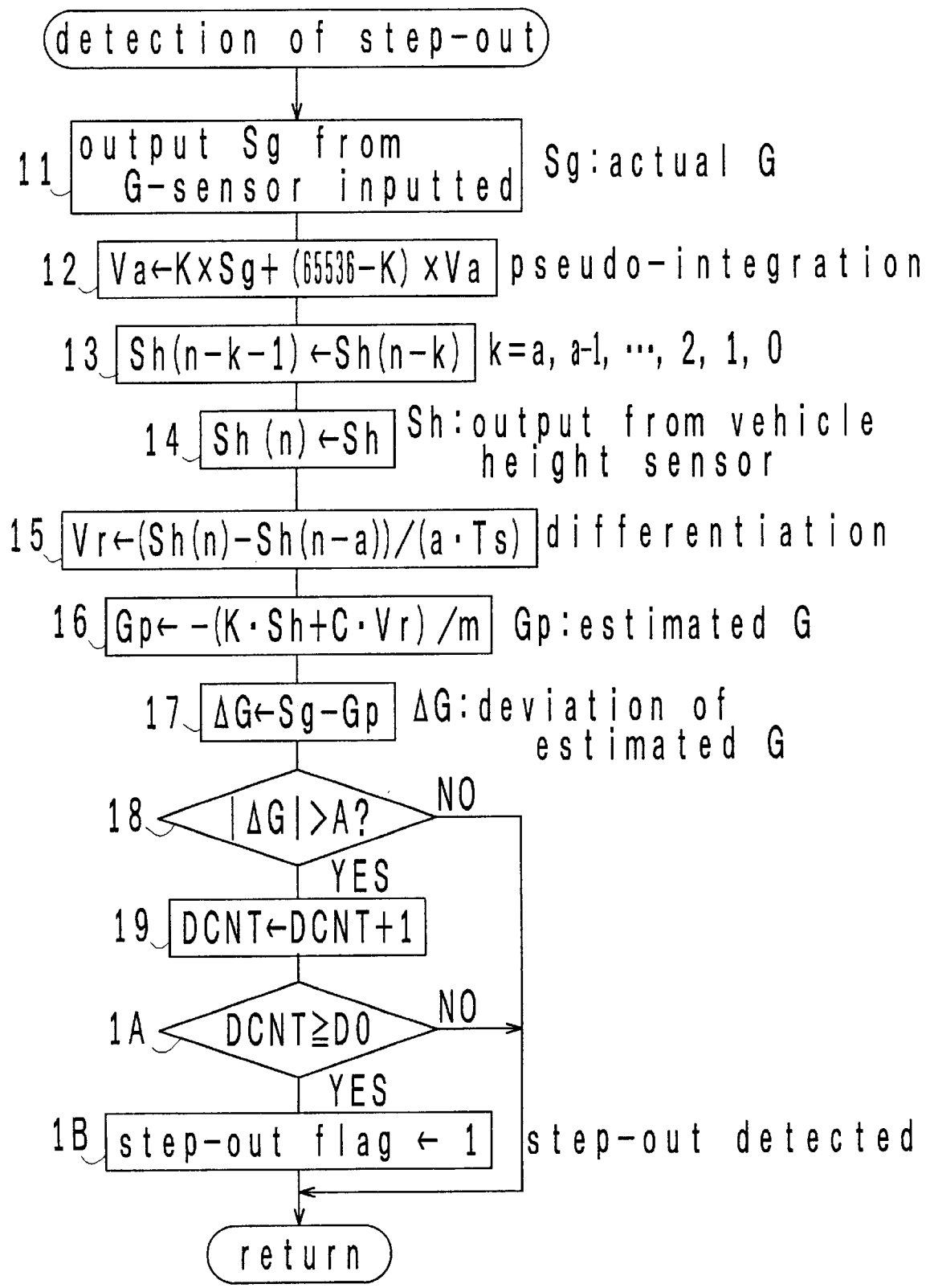
FIG. 1 is a flow chart illustrating the operation of a CPU shown in FIG. 6.
Figure 2:
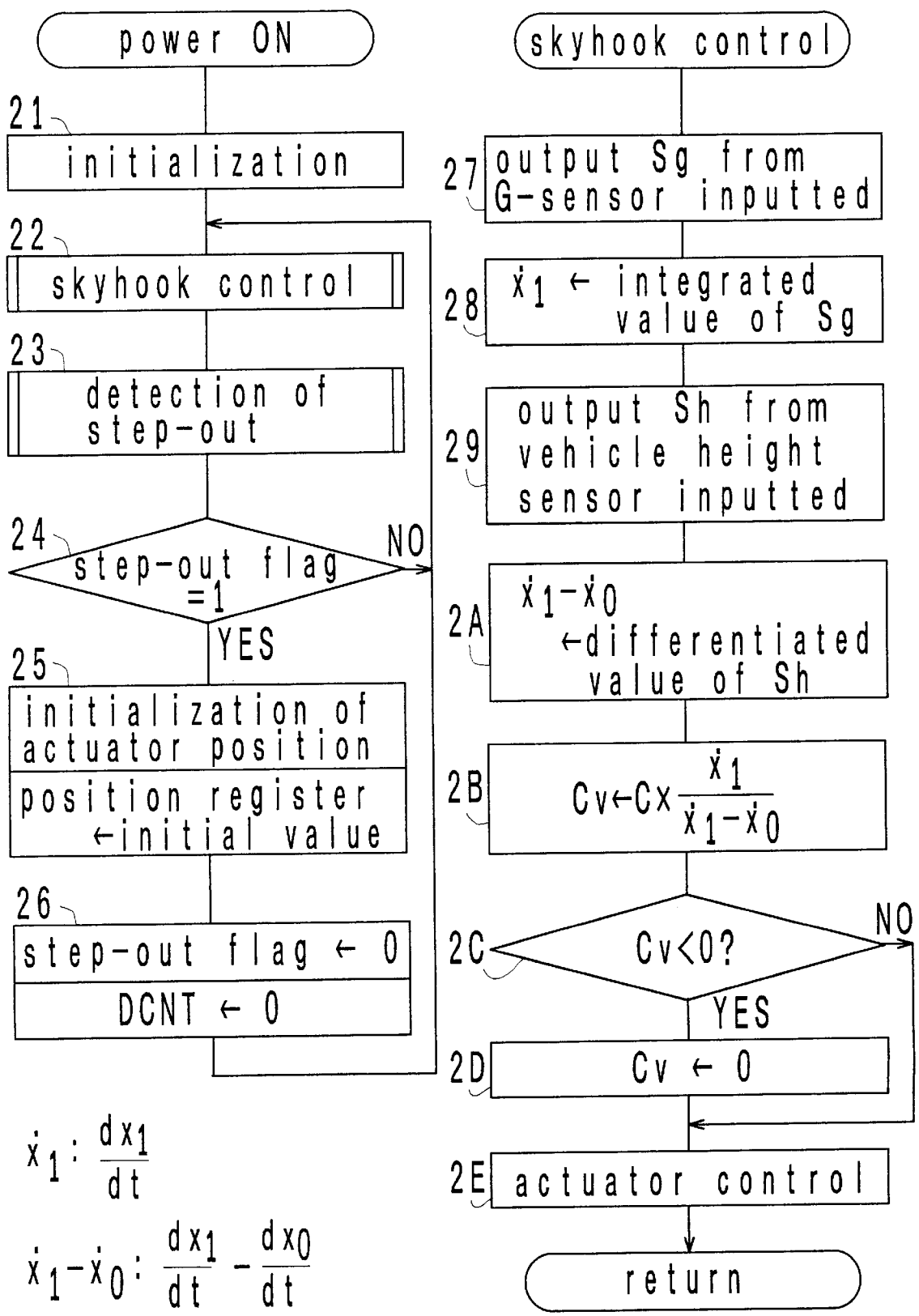
FIG. 2 is similarly a flow chart illustrating the operation of the CPU shown in FIG. 6.

The operation performed by the microcomputer CPU is shown in detail in FIGS. 1 and 2. A main routine will be described first with reference to FIG. 2. When turning on the power supply, an initialization is executed at an initial step 21. Specifically, the electrical circuit including the microcomputer CPU is initialized and the positions of the actuators 3FL, 3FR, 3RL and 3RR are also initialized. When initializing each actuator, the actuator is driven beyond 16 steps in a given direction. In this manner, each actuator comes to a stop at a home position which is mechanically determined as a limit position, so that the CPU is capable of sensing the actual damping factor of the respective shock absorbers under this condition. Thus, the damping factors of the shock absorbers when the associated actuators assume their home positions are stored in a memory. Subsequently, the actual damping factor which is stored is sequentially updated in accordance with the number of steps by which and the direction in which the actuator is driven.

Accordingly, the damping factor which is recognized by the CPU is maintained in coincidence with the actual damping factor of the respective shock absorbers. However, when the actuator fails to track an actuator controlling output delivered from the CPU, a so-called step-out occurs, whereupon the damping factor recognized by the CPU no longer matches the actual damping factor of the shock absorber.

Upon completion of the initialization, "skyhook control" is executed at step 22, followed by the execution of "detection of step-out" at step 23 and checking of the status of a step-out flag at step 24. The operation of these steps is then repeated. When the step-out flag is found as set at step 24, the program proceeds to step 25 where the initialization of the actuator position is executed again, thus loading initial values in position registers which store position information of the actuators. At next step 26, the step-out flag is cleared as is a counter DCNT. CPU is then enabled to determine a damping factor on the basis of values stored in the position registers.

As will be described later, when a step-out of any actuator occurs, the step-out flag is set, whereby the steps 25 and 26 are executed automatically. This brings the actual position of each actuator into coincidence with a corresponding value stored in the position register, whereby the CPU is enabled to recognize a correct value of the damping factor again.

The "detection of step-out" which is executed at step 23 will be described in detail with reference to FIG. 1. It is to be understood that the processing operation illustrated in FIG. 1 is executed for each of the suspensiosns. At initial step 11, an acceleration Sg delivered from each acceleration sensor is input. An acceleration Sg(RR) for the rear right wheel is determined according to the following equation.

$$Sg(RR)=Sg(FR)+Sg(RL)-SG(FL) \quad (4)$$

At step 12, the acceleration which is input or calculated at step 11 is integrated, and the integrated value is stored in a register Va. K indicated at step 12 represents an integrating constant.

A plurality of registers Sh(n)–Sh(n–a–1), which are equal in number to (a+2), are associated with vehicle height information at each suspension position in order to save past vehicle height information. Specifically, a register Sh(n–k) saves vehicle height information which was sampled k-cycles before. At step 13, a value in the register Sh(n–k) (where k=a to 0) is successively transferred to the register Sh(n–k–1), and at step 14, latest vehicle height information Sh is stored in a register Sh(n). At step 15, a differential of the vehicle height, or a rate of relative displacement between the sprung and the unsprung mass, is calculated from the difference between latest vehicle height information stored in the register Sh(n) and vehicle height information which was sampled a-cycles before and now saved in the register Sh(n–k), and the value of this differential is stored in a register Vr. Ts indicated at this step represents a sampling period.

Considering the equation of motion for the suspension as shown by the equation (1), $(x_1-x_0)$ represents an output Sh from each vehicle height sensor, and $(dx_1/dt)-(dx_0/dt)$ represents a value of Vr. Accordingly, the equation (1) can be rewriteen as follows:

$$(d^2x_1/dt^2)=-(K \cdot Sh+C \cdot Vr)/m \quad (5)$$

In the equation (5), the mass m, the spring constant K and the camping factor C are either constants or values which can be sensed by the CPU. However, it should be understood that the damping factor C which is sensed by the CPU represents an estimated value, which no longer matches an actual damping factor in the event a step-out of the actuator occurs. Accordingly, at step 16, the CPU calculates $-(K \cdot Sh+C \cdot Vr)$, thus deriving an estimated value for the acceleration $(d^2x_1/dt^2)$ for each position of the suspension, and such value is stored in a register Gp.

The actual acceleration $(d^2x_1/dt^2)$ applied to the sprung mass of each suspension is either equal to a value delivered from the acceleration sensor 4FL, 4FR or 4RL, or a value calculated according to the equation (4) (Sg(FL), Sg(FR), Sg(RL,) or Sg(RR)). By way of example, referring to FIG. 4, it will be seen that in the absence of the step-out of the actuator, the estimated acceleration saved in the register Gp has a relatively small deviation from the actual acceleration, but the deviation therebetween increases upon occurrence of the step-out. Accordingly, the presence or absence of any step-out occurring can be distinguished in accordance with the magnitude of such deviation.

At step 17, Sg-Gp, namely, a deviation between the actual value and the estimated value of the acceleration (G) is calculated and stored in a register ΔG, and at next step 18, the absolute magnitude of the deviation (ΔG) is compared against a threshold A. If |ΔG|>A, the program proceeds from step 18 to step 19 where the counter DCNT is incremented by one. At the following step 1A, the value in the counter DCNT is compared against the constant $D_0$, and if DCNT≧$D_0$, the program proceeds to step 1B where the step-out flag is set. It is to be noted that the step-out flag is not set if |ΔG|>A as long as DCNT<$D_0$. In other words, a temporary increase in the deviation ΔG due to noises has no influence, but the detection of the step-out occurs at a given time interval $T_0$ after the deviation ΔG has exceeded the threshold, as indicated in FIG. 4. This achieves a high reliability in detecting the occurrence of the step-out.

The counter DCNT is cleared to 0 by the initialization at step 21, and is also cleared at step 16 upon detecting the occurrence of the step-out. The "detection of step-out" shown in FIG. 1 is repeatedly executed at a given time period T, and accordingly, the time delay $T_0$ required in detecting the step-out is equal to T×$D_0$.

The "skyhook control" shown at step 22 will be described in detail with reference to FIG. 2. The skyhook control takes place for each of the suspensions. At initial step 27, an acceleration Sg which is output from each acceleration sensor is input, and the acceleration Sg(RR) for the rear right wheel is derived according to the equation (4).

At step 28, the acceleration which is input or derived at step 27 is integrated to provide an integral, namely, the rate of displacement of the sprung mass, which is stored in a given register. This operation takes place in the identical manner with that described above in connection with the step 12. At next step 29, the latest vehicle height information Sh which is delivered from each vehicle height sensor is stored in the register Sh(n), and at following step 2A, a differential of the vehicle height information Sh or the rate of relative displacement between the sprung and the unsprung mass is calculated and stored in a given register. The operation that takes place in order to derive the differential remains the same as described above in connection with the steps 13, 14 and 15.

At next step 2B, a target value of the damping factor Cv for the skyhook control is calculated. The target value of the damping factor Cv is derived as the rate of displacement ($dx_1/dt$) of the spring system divided by the rate of relative displacement ($dx_1/dt - dx_0/dt$) between the sprung and the unsprung mass, multiplied by the constant C. However, since a shock absorber cannot realize a negative value of the damping coefficient, at the following step 2C, an examination is made to see whether or not Cv is negative, and if it is negative, 0 is substituted for Cv. At next step 2E, each actuator is driven for rotation until it reaches a position where the damping factor of each shock absorber matches the target value of the damping factor Cv. When driving the actuator for rotation, the content of the position register associated with each actuator is updated in accordance with the direction in which it is driven and the number of steps, thus maintaining the prevailing position of the actuator or the damping factor of the shock absorber.

In the described embodiment, the acceleration sensor for the suspension associated with the rear right wheel has been omitted, and is derived by calculation from the outputs of three other acceleration sensors. However, it should be understood that four acceleration sensors may be associated with each of the suspensions. However, the arrangement according to the described embodiment reduces the cost required.

As described, in accordance with the invention, the determination of the presence or absence of any step-out of the actuator which adjusts the damping factor can always be made on the basis of a deviation between the actual acceleration (Sg) detected by the acceleration detecting means and the estimated acceleration (Gp) calculated by the acceleration estimating means, thus eliminating the need for the provision of any special sensor for the purpose of detecting the occurrence of the step-out and thus reducing the cost of the arrangement.

While an embodiment of the invention has been disclosed above, it should be understood that the invention is not limited thereto, but that a number of changes, modifications and substitutions therein will readily occur to one skilled in the art without departing from the scope and spirit of the invention defined by the appended claims.

What is claimed is:

1. An apparatus for detecting step-out of a suspension control system including a shock absorber, a mechanism which adjusts a damping factor and a controller for driving the mechanism toward a given target value so as to set up the damping factor of the shock absorber at the target value, the apparatus comprising:

distance detecting means for detecting a relative distance between a first object which supports a suspension and a second object supported by the suspension;

acceleration detecting means for detecting a vertical acceleration applied to the second object supported by the suspension;

acceleration estimating means for determining an estimated value of the vertical acceleration applied to the second object supported by the suspension on the basis of the relative distance detected by the distance detecting means, an equation of motion defining a relationship among a sprung mass, a spring constant of a suspension spring, a position of the sprung mass and a position of the unsprung mass and said damping factor of the shock absorber which is set by the controller; and step-out detecting means for detecting a deviation between an actual condition of the damping factor adjusting mechanism and a condition sensed by the controller in accordance with a deviation between the actual acceleration detected by the acceleration detecting means and the estimated acceleration determined by the acceleration estimating means.

2. An apparatus according to claim 1 in which the step-out detecting means determines the presence of said deviation between the actual condition of said mechanism and the condition sensed by the controller upon a basis of the number of times that the deviation between the actual acceleration and the estimated acceleration exceeds a given threshold and the duration of said deviation continues to exceed said given threshold.

3. An apparatus according to claim 1, further including initializing means for repositioning the damping factor adjusting mechanism to a given initial condition in the event the step-out detecting means determines the presence of said deviation between the actual condition of said mechanism and the condition sensed by the controller.

* * * * *